US008474178B2

(12) United States Patent  (10) Patent No.: US 8,474,178 B2
Kassouni  (45) Date of Patent: Jul. 2, 2013

(54) SUPPORT FOR PLANTS

(76) Inventor: Van M. Kassouni, Grand Rapids, MI (US)

( * ) Notice: Subject to any disclaimer, the term of this patent is extended or adjusted under 35 U.S.C. 154(b) by 462 days.

(21) Appl. No.: 12/784,253

(22) Filed: May 20, 2010

(65) Prior Publication Data

US 2010/0313472 A1 Dec. 16, 2010

Related U.S. Application Data

(60) Provisional application No. 61/185,769, filed on Jun. 10, 2009.

(51) Int. Cl.
*A01G 17/06* (2006.01)
(52) U.S. Cl.
USPC .................................................. 47/45
(58) Field of Classification Search
USPC .................................. 47/44, 45, 47
See application file for complete search history.

(56) References Cited

U.S. PATENT DOCUMENTS

| 527,911 | A | 10/1894 | Watkins |
| 3,805,340 | A | 4/1974 | Bush et al. |
| 4,005,548 | A | 2/1977 | Nahon |
| 4,110,951 | A | 9/1978 | Padrun |
| 4,483,098 | A | 11/1984 | Anderson |
| 4,655,000 | A | 4/1987 | Swick et al. |
| 5,056,198 | A | 10/1991 | Viglione |
| 5,253,768 | A | 10/1993 | Traversa et al. |
| 5,473,796 | A | 12/1995 | Fusillo |
| 5,640,802 | A | 6/1997 | Elliott |
| D402,396 | S | 12/1998 | Protz, Jr. |
| 5,913,477 | A | 6/1999 | Dean |
| 6,234,444 | B1 | 5/2001 | Haddad |
| 6,718,691 | B2 | 4/2004 | Taylor |
| 7,188,448 | B2 * | 3/2007 | Sedlacek ............... 47/47 |
| 7,735,259 | B2 * | 6/2010 | Rich et al. ............. 47/47 |
| 2004/0068925 | A1 | 4/2004 | Puspurs |
| 2005/0039391 | A1 | 2/2005 | Morse |
| 2007/0266627 | A1 | 11/2007 | Shelton |
| 2009/0217578 | A1 * | 9/2009 | Beasley et al. ........ 47/47 |
| 2010/0313472 | A1 * | 12/2010 | Kassouni ............... 47/46 |

FOREIGN PATENT DOCUMENTS

| DE | 3322070 A1 * | 12/1984 | .............. 47/44 |
| DE | 3437769 A1 * | 4/1986 | .............. 47/47 |
| EP | 89291 A1 * | 9/1983 | .............. 47/47 |
| FR | 2578712 A1 * | 9/1986 | .............. 47/44 |
| JP | 406335326 | 12/1994 | |
| JP | 2001299107 | 10/2001 | |
| JP | 03143858 | 7/2008 | |
| KR | 2019960004030 | 5/1996 | |
| KR | 2019990041593 | 12/1999 | |

OTHER PUBLICATIONS

International Search Report and Written Opinion of corresponding PCT Application No. PCT/US2010/035633.

* cited by examiner

*Primary Examiner* — Frank T Palo
(74) *Attorney, Agent, or Firm* — Gardner, Linn, Burkhart & Flory, LLP

(57) ABSTRACT

A plant support is assembled from a plurality of interchangeable parts that can be readily assembled together to form a complete plant assembly having a desired size, in either an open or closed configuration, and to readily permit disassembly for storage or reconfiguration of the support. The plant support may be made up of various horizontal and vertical members that are configured to readily attach and detach from one another in order to form supports in various shapes and sizes such as enclosures or trellis-type supports.

23 Claims, 13 Drawing Sheets

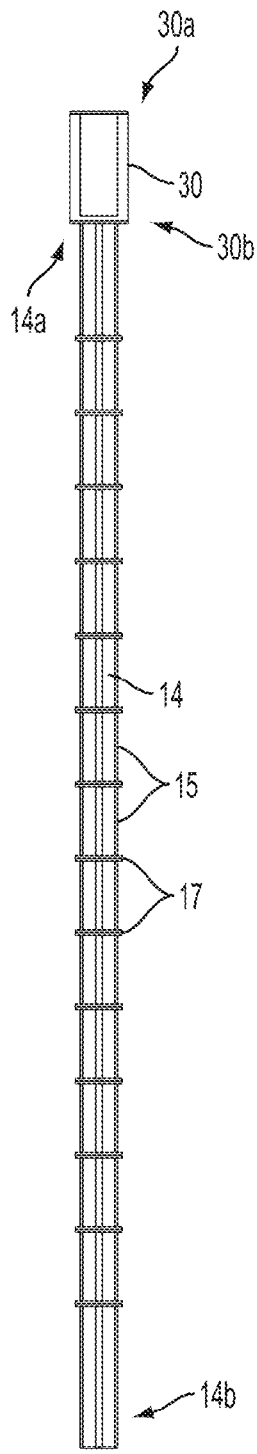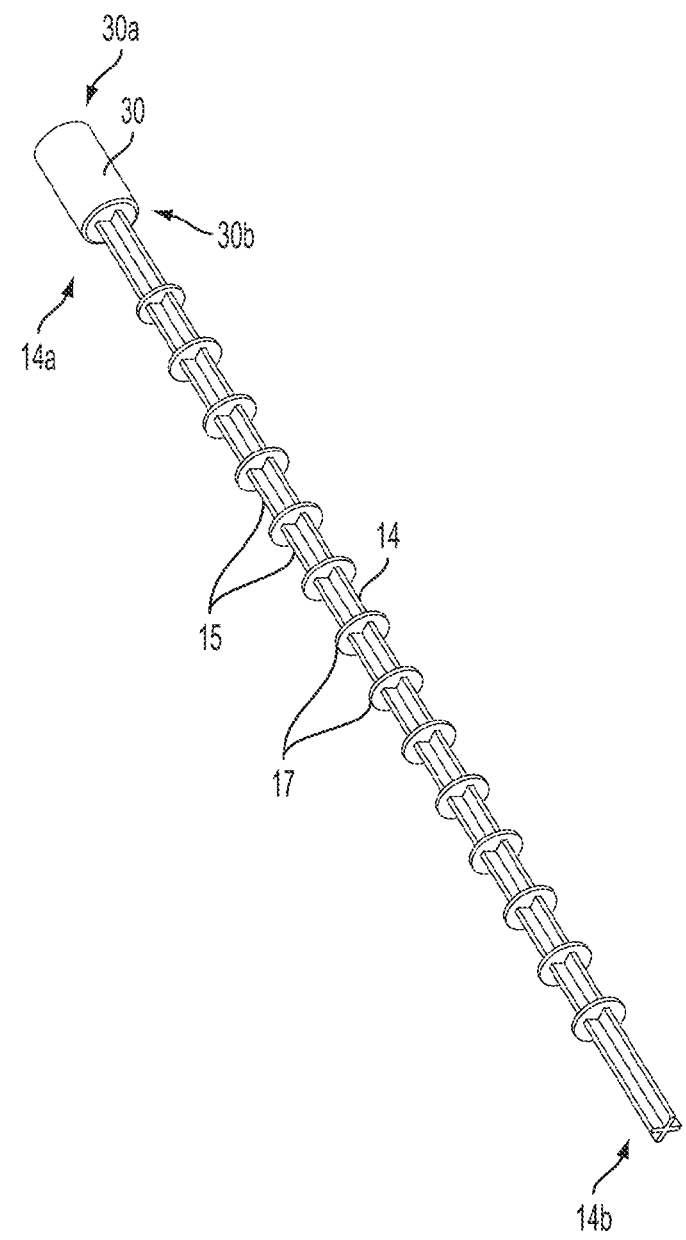
FIG. 2
FIG. 3

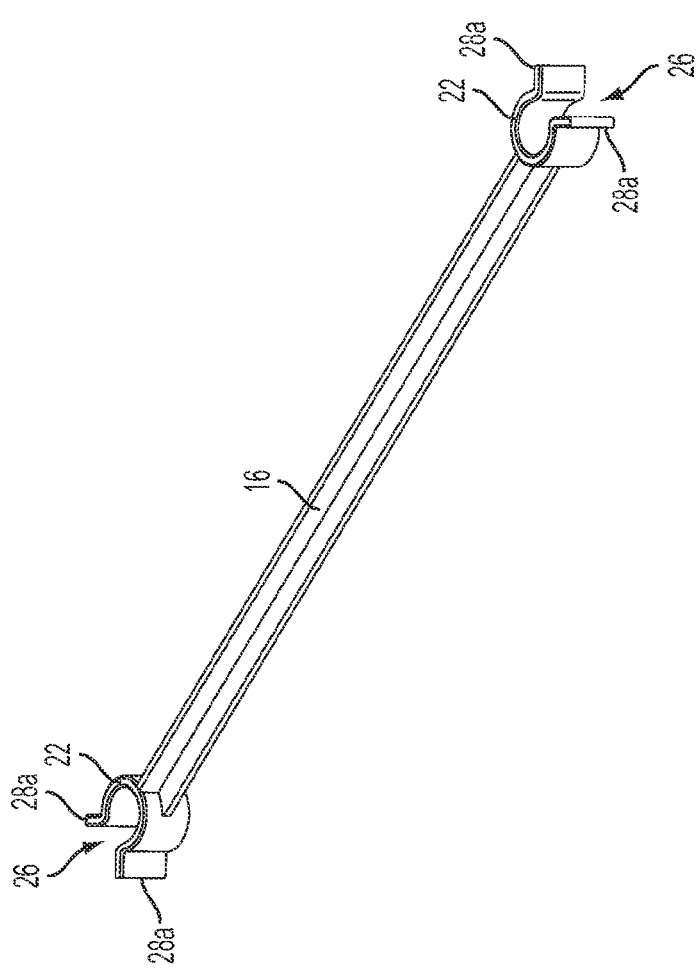
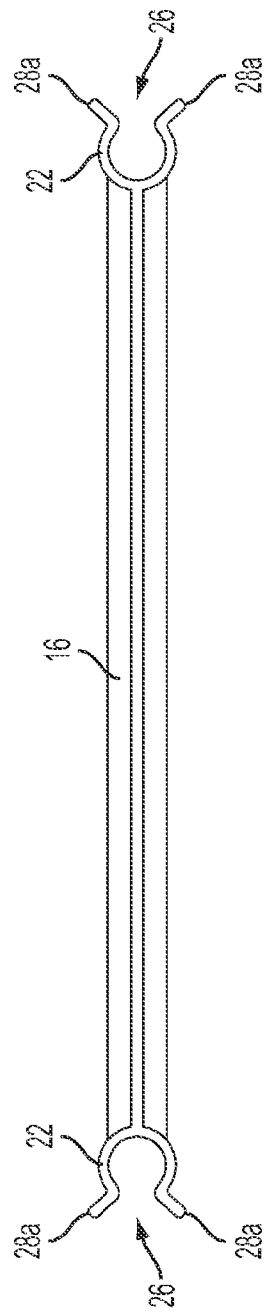
FIG. 4
FIG. 5

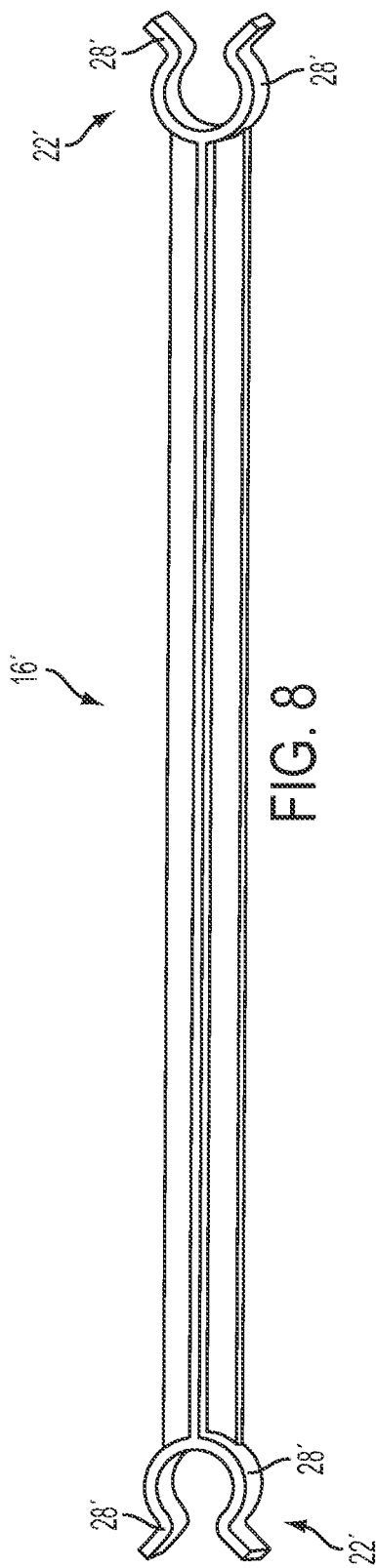
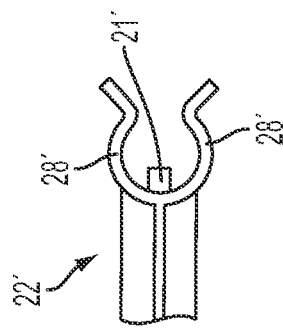
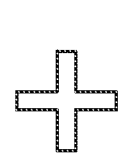
FIG. 8
FIG. 9B
FIG. 9A

SUPPORT FOR PLANTS

CROSS REFERENCE TO RELATED APPLICATION

The present application claims the benefit of U.S. provisional application Ser. No. 61/185,769, filed Jun. 10, 2009, which is hereby incorporated herein by reference in its entirety.

FIELD OF THE INVENTION

The present invention relates generally to support structures, and, more particularly, to supports for garden plants and the like.

BACKGROUND OF THE INVENTION

Vegetation supports are typically made of metal wire, and include ground stakes at their lower portions for inserting into a relatively soft ground surface in order to support one or more plants growing from the surface. Typical plant supports are of a fixed size with multiple sizes of plant supports offered to accommodate different sizes of plants. Typical plant supports occupy a significant amount of space in storage, and must be purchased in various sizes to accommodate plants that can grow significantly throughout a growing season.

SUMMARY OF THE INVENTION

The present invention provides a plant support assembled from a plurality of interchangeable parts that can be readily assembled together to form a complete plant assembly having a desired size, in either an open or closed configuration, and to readily permit disassembly for storage or reconfiguration of the support. The plant support may be made up of various horizontal and vertical members that are configured to readily attach and detach from one another in order to form supports in various shapes and sizes, such as enclosures or trellis-type supports.

According to an aspect of the present invention, a plant support assembly includes a plurality of supports having opposite end portions (such as upper and lower end portions when the supports are disposed in a generally vertical orientation). The supports comprise a plurality of stop members spaced therealong. The plant support assembly includes a plurality of non-vertical supports or cross supports or lateral supports, with the lateral supports having end portions for engaging the generally vertical supports between the stop members. At least one of the end portions of each of the lateral supports releasably engages one of the generally vertical supports between adjacent ones of the stop members. The stop members are configured to limit movement of the lateral support along the generally vertical support.

Optionally, the stop members may comprise disc portions having diameters that are approximately equal to a diameter of the cross dimensions of the generally vertical support between the disc portions. Optionally, the disc portions may have a diameter that is greater than the diameter of the cross dimension of the support between the spaced apart disc portions. Optionally, the upper end of the generally vertical support may include a coupler that is configured to join the upper end portion of one of the generally vertical supports to a lower end portion of another of the generally vertical supports.

These and other objects, advantages, purposes and features of the present invention will become more apparent upon review of the following specification in conjunction with the drawings.

BRIEF DESCRIPTION OF THE DRAWINGS

FIG. 2 is a side elevation and partial sectional view of a vertically oriented post of the plant support assembly of FIG. 1;

FIG. 3 is a perspective view of the vertical post of FIG. 2;

FIG. 4 is a perspective view of a connecting rod or lateral support of the plant support assembly of FIG. 1;

FIG. 5 is a top plan view of the connecting rod of FIG. 4;

FIG. 8 is a connecting rod useful in conjunction with the vertical post of FIG. 6;

FIG. 9A is a sectional view of the connecting rod of FIG. 8;

FIG. 9B is a top plan view of an end portion of the connecting rod of FIG. 8;

DESCRIPTION OF THE PREFERRED EMBODIMENTS

Figure 1:
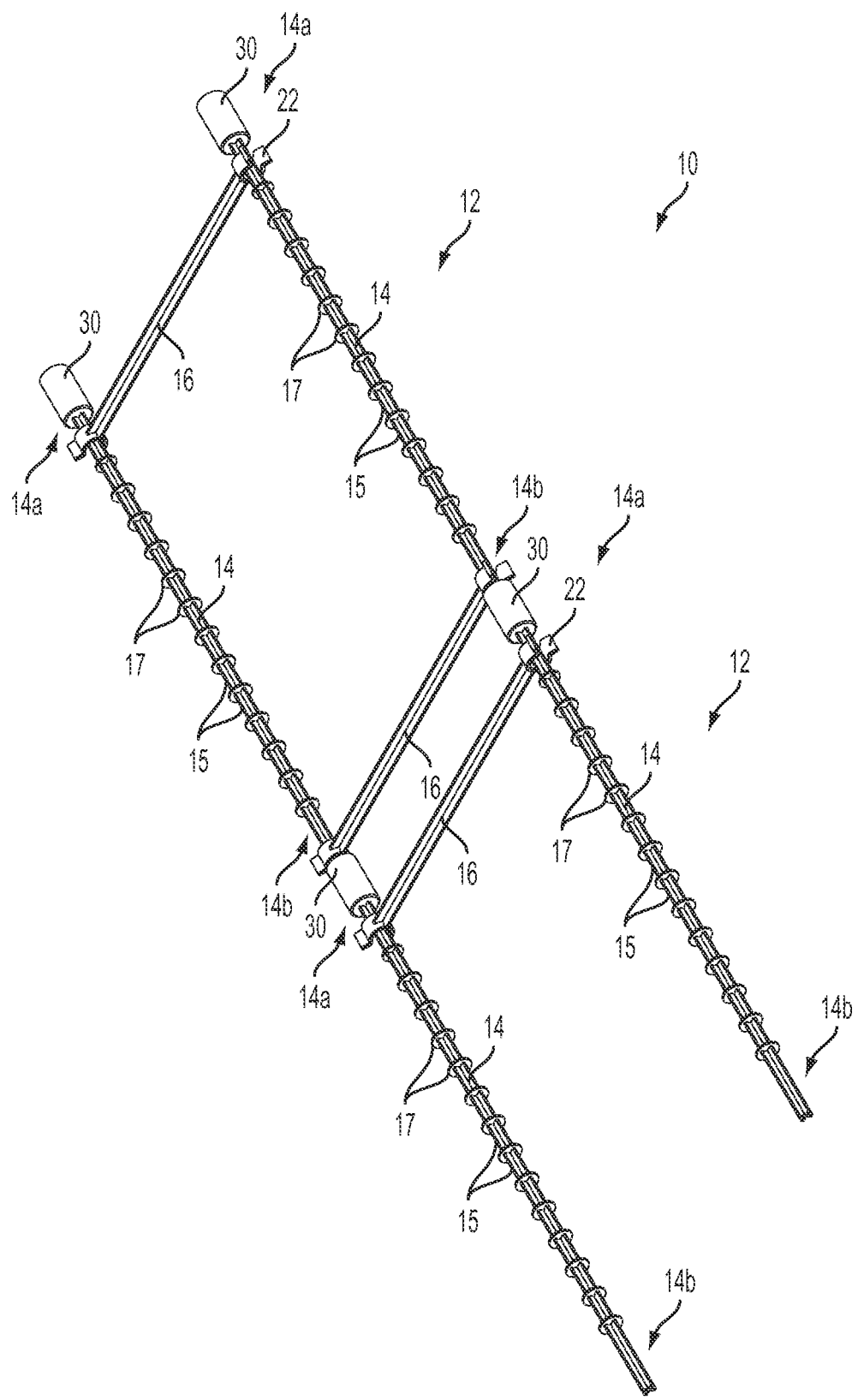
FIG. 1 is a perspective view of a plant support assembly in accordance with the present invention.

Referring now to the drawings and the illustrative embodiments depicted therein, a plant support assembly 10 (FIG. 1) provides support for plants, such as garden plants, small trees, shrubs, potted plants, and the like, in order to keep the plants substantially elevated and spaced above a soil surface. In the illustrated embodiment of FIG. 1, plant support assembly 10 is constructed from a pair of subassemblies 12 stacked one atop the other. Each subassembly 12 is made up of a pair of vertical posts or supports 14 and at least one horizontal or non-vertical or cross or lateral bar or support or connecting rod 16 that joins the posts together. The lateral supports 16 may be clipped or snapped to the vertical posts 14 at desired locations along the post or posts 14 to form the desired or appropriate support structure configuration for the particular application of the support assembly, as discussed below. As will be more fully described below, multiple subassemblies 12 may be joined side-by-side and/or one atop the other to form different sizes and shapes of support assemblies or structures, such as straight or angled fences or trellises, and various closed forms such as polygonal shapes (when viewed from above) or the like.

Vertical posts 14 are configured for use in a generally vertical orientation (such as via insertion of a lower end of the post into the support surface or ground or the like such that the post is disposed in a generally vertical orientation) include upper end portions 14a and lower end portions 14b (FIGS. 1-3). Vertical posts 14 may comprise a plastic or polymeric or metallic material and may be substantially rigid so that lower end portions 14b are insertable into a soil surface or any other relatively soft material or growth media. For example, vertical posts 14 may comprise any suitable material, such as molded or extruded plastic or polymeric materials, fiber-filled resins, metal, wood, or the like. As best shown in FIG. 3, vertical post 14 is generally cross-shaped at cross-shaped sections 15, with a plurality of spaced apart stop members or disc portions 17 disposed or formed or established along the post 14 and between the cross-shaped sections in alternating fashion along a substantial portion of the length of the post. Cross-shaped sections 15 and disc portions 17 may support vertical loads on vertical posts 14, while also resisting bending or twisting of the post.

Disc portions 17 of vertical support 14 have a greater diameter than the outer dimensions of cross-shaped sections 15 for supporting horizontal supports 16 in a manner described below. Disc portions 17 are sufficiently spaced from one another so that at least one, and optionally two or more, horizontal supports 16 may be simultaneously coupled to the vertical post 14 at a given cross-shaped section of the post between any two adjacent disc portions. In addition to supporting horizontal supports 16, disc portions 17 provide support surfaces for vines and other climbing plants, and offer at least partial or limited vertical support for other plants that contact the disc portions. Although shown as generally round in shape, it will be appreciated that disc portions 17 may be substantially any shape, such as ellipsoidal or polygonal or the like, without departing from the spirit and scope of the present invention.

Optionally, two or more posts 14 may be generally vertically stacked or joined together to form or establish a taller configuration or assembly, depending on the particular application of the plant support assembly. For example, a hollow-cylindrical coupler or barrel 30 may be positioned or formed at upper end portion 14a of a vertical post 14, and may be configured to facilitate stacking of multiple plant support subassemblies 12, such as shown in FIG. 1. Barrel 30 includes an upper end portion 30a and a lower end portion 30b, with the upper end portion 30a having an opening in its upper surface for receiving the lower end portion 14b of an upper vertical post, and the lower end portion 30b for stopping or limiting travel of the vertical post as it is inserted into the barrel. In addition, and as shown in FIG. 2, barrel 30 is attached or formed or molded at lower end portion 30b to upper end portion 14a of vertical post 14. Thus, barrel 30 at an upper end portion 14a of a lower post may receive lower end portion 14b of an upper post via an interference fit to frictionally retain the lower end portion of the upper post in the barrel of the lower post. Barrel 30 may be molded or integrally formed at the upper end of a post (such as shown) or may be otherwise attached to the upper end of the post. Optionally, the barrel element may comprise a separate part or coupler that receives the upper end of a post at one end and a lower end of a post at the other end to couple the posts together. Optionally, the barrel element or stacking or joining element may comprise an angled element such that, when attached or disposed at an upper end of a generally vertical post, an upper post may be disposed or attached at the barrel element and may extend at an angle away from vertical as it extends from the barrel element and lower vertical post. Thus, different shapes may be established or configured via use of posts and cross supports (and the cross supports or non-vertical supports may have angled connectors to further enhance the versatility and adaptability of the plant support assembly to configure to almost any desired shape or form).

Horizontal supports or connecting rods 16 may comprise a plastic or polymeric material and may be molded or formed with generally cross-shaped cross sections, and include releasable couplers or clips 22 (FIGS. 1, 4, and 5) at opposite ends thereof. In the illustrated embodiment, each releasable coupler 22 comprises a generally C-shaped open-ended collar having an open end 26 for releasably receiving one of vertical posts 14 at one of the cross-shaped sections 15 of the vertical post. Each coupler 22 includes a pair of flexible opposed portions or legs 28 that cooperate to define the C-shape that generally corresponds to the outer dimensions of vertical posts 14. Each opposed leg 28 includes an outwardly-flared portion 18a that facilitates releasable coupling of coupler 22 to vertical post 14 by guiding the vertical post through the open end 26 of coupler 22, whereby opposed legs 28 initially flex apart to receive the cross-shaped section of the vertical post, and then contract or return to or toward their initial state around the vertical post to retain the cross-shaped section inside the C-shaped channel defined between the opposed legs 28, such as shown in FIG. 1. Horizontal supports 16 serve to hold vertical posts 14 at a substantially fixed or stable or uniform or controlled spacing from one another, and stabilize both subassemblies 12 and support assembly 10. Horizontal supports 16 may comprise any suitable material, such as substantially similar materials to the vertical post materials, so long as legs 28 are sufficiently strong and resilient to readily permit flexing without fracture or permanent deformation. In addition, horizontal supports 16 form support surfaces for plants or portions of plants growing upwardly along support assembly 10, and are readily attached to and detached from vertical posts 14 for assembly and/or reconfiguration of the desired or appropriate structure, and/or storage of the individual components of the plant support assembly.

When the horizontal supports 16 are coupled to vertical posts 14, the releasable coupler 22 of each horizontal support 16 is limited or substantially precluded from sliding downward (or upward) along vertical posts 14 by the coupler 22 or opposed legs 28 contacting an adjacent one of the disc portions 17, or by contacting another coupler 22 of another horizontal support 16 that is in contact with a disc portion 17. Disc portions 17 thus serve to limit downward or sliding movement of releasable coupler 22 along the vertical post 14 when the supports and posts are assembled to a desired or appropriate configuration or structure. Optionally, it will be appreciated that other means of limiting or substantially precluding sliding of the couplers along the vertical posts are contemplated, such as those described below with reference to FIGS. 6-9B, while remaining within the spirit and scope of the present invention. Optionally, for example, the opposed legs and coupler may be formed with a slot that may receive a disc portion when the coupler is attached to or clipped to a vertical post at the disc portion, whereby the disc portion may limit upward and downward movement of the coupler along the vertical post.

Also, when the horizontal supports are attached to the vertical posts via the couplers 22, the horizontal supports 16 are substantially free to rotate 360 degrees around the post 14 until positioned at a desired or appropriate orientation or angle relative to the vertical post and/or another horizontal support. Thus, the horizontal supports may be readily rotated or pivoted or swung to the desired or appropriate orientations (while the horizontal supports are attached to the vertical posts) to arrange or configure or adjust or reconfigure the horizontal supports and support assembly for the particular application of the plant support assembly.

Optionally, the releasable couplers at each end of the horizontal support or cross-member may be angled relative to a longitudinal axis of the cross-member. Thus, the cross-member or support may be disposed or arranged in a non-horizontal or laterally extending orientation and may extend between two adjacent vertical posts at an angle (such as, for example, 20 degrees or 30 degrees or 45 degrees) relative to a horizontal plane, while the couplers have a generally vertical axis of the respective receiving passageway so as to facilitate coupling of the angled cross-member to the generally vertical supports or posts. Such an angled cross-member configuration may further enhance the versatility of the support assembly and/or may enhance the structural rigidity of the support assembly.

Figure 6:
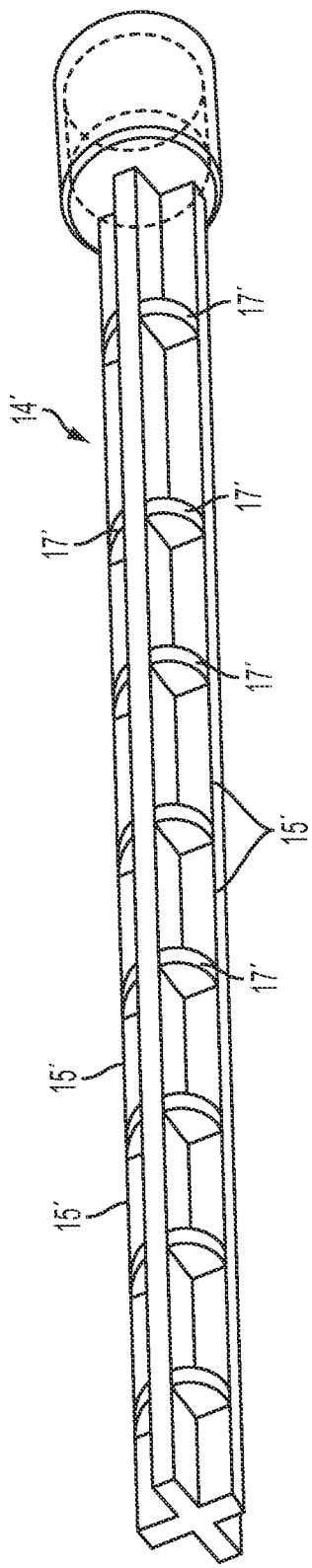
FIG. 6 is a vertical post in accordance with another embodiment of the present invention.
Figure 7A:
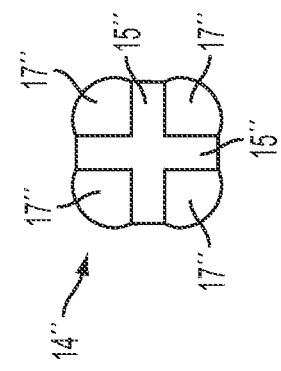
FIG. 7A is a sectional view of the vertical post of FIG. 6.
Figure 7B:
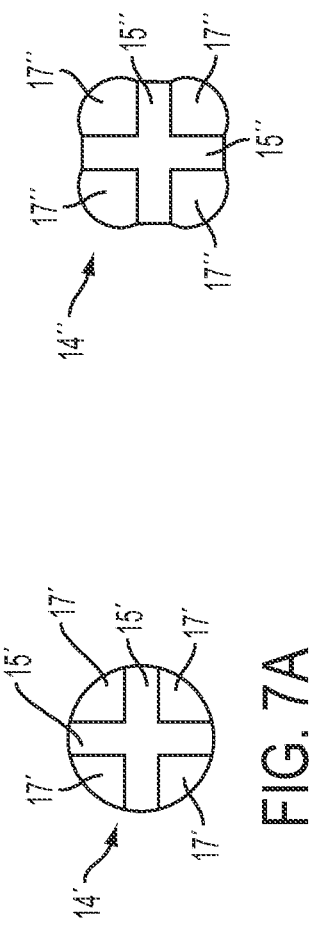
FIG. 7B is a sectional view of another vertical post of the present invention.

Optionally, and with reference to FIGS. 6 and 7A, a vertical post 14' of a plant support assembly of the present invention may include generally cross-shaped sections 15' with disc portions 17' spaced along the vertical post 14'. As shown in FIG. 7A, disc portions 17' do not extend radially past a diameter or cross-dimension of the cross-shaped portion 15' of the vertical post 14'. Disc portions 17' thus may have the same diameter as the cross-dimension of the cross-shaped portion or may have a smaller diameter than the cross-dimension of the cross-shaped portion, and thus the disc portions 17' may be engaged by tabs or extensions 21' (FIG. 9B) disposed at or inside and extending from releasable couplers 22' at opposite ends of a horizontal support 16' (FIG. 8). Horizontal support 16' may be substantially similar to horizontal support 16, and may include one or more tabs 21' extending radially inward into the channel defined by opposed legs 28' of releasable couplers 22'.

When horizontal support 16' is installed at vertical post 14', the radially inwardly-extending tabs 21' extend into the spaces between adjacent legs or cross-elements of cross-shaped section 15', and engage or rest upon an upper surface of one of disc portions 17' when the support 16' is disposed at a level at or near the disc portion, whereby the disc portions limit or substantially preclude further vertical movement (such as downward movement) of the horizontal support 16' along the vertical post 14'. Optionally, a horizontal support (similar to support 16' of FIG. 8, but lacking the radially inwardly-extending tabs 21') may be prevented from sliding by modified disc portions 17" disposed or formed at and spaced along a vertical post 14" (FIG. 7B), where vertical post 14" includes disc portions 17" that extend radially outwardly from the outer dimensional limits of cross shaped sections 15". In such an application, the upper surfaces of disc portions 17" may engage the lower surfaces of the opposed legs of the releasable coupler of the horizontal support, which may or may not include radially inwardly-extending tabs at its coupler.

Referring now to FIGS. 10-12B, another plant support assembly 110 (FIG. 10) may be made up of a plurality of subassemblies 112 (FIG. 11) including vertical posts or supports 114 and horizontal or non-vertical bars or supports 116. In the illustrated embodiment of FIG. 10, plant support assembly 110 is assembled or configured to be generally triangular in shape when viewed from above, and includes three subassemblies 112 cooperating in a manner described below. A plurality of connecting rods or elements 118 is provided at and along an upper end of the assembly and connecting to the upper ends of the vertical posts to stabilize plant support assembly 110.

Vertical posts 114 include upper end portions 114a and lower end portions 114b.

Vertical posts 114 may comprise any suitable material and may be substantially rigid so that lower end portions 114b are insertable into a soil surface, or substantially any other relatively soft material or growth media. Vertical post 114 may have a substantially continuous cross-shaped section in order to primarily support vertical loads while also resisting bending or twisting of the post, and may be made from extruded plastic, fiber-filled resins, and the like. The size or cross dimension of the vertical post is sized to be receivable in the couplers of the horizontal supports 116 when the supports and posts are assembled together and configured to the desired or appropriate shape of the completed plant support assembly.

Horizontal supports 116 are similarly molded or formed with cross-shaped cross sections, and include a fixed coupler 120 and a releasable coupler 122 at opposite ends thereof. The couplers 120, 122 are configured to attach or connect the support 116 to and between a pair of posts. Fixed coupler 120 may be fixedly attached or secured to vertical post 114, such as via snapping or molding or welding the fixed coupler to the post. In the illustrated embodiment, the fixed coupler 120 is generally C-shaped to define or establish a space or passageway 124 (FIG. 11) that is large enough to receive a leg 128 of a releasable coupler 122 of another support to permit attachment of a releasable coupler 122 of an adjacent subassembly 112 to the vertical post 114 at passageway 124 of fixed coupler 120.

Releasable coupler 122, located at an opposite end of horizontal support 116 from fixed coupler 120, is a generally C-shaped open-sided collar having an open end 126 for releasably receiving the vertical post of an adjacent subassembly, such as in a similar manner as discussed above. Each releasable coupler 122 includes a pair of flexible opposed portions or legs 128 cooperating to define the C-shape, with the legs being spaced apart and shaped to generally correspond to or to adapt to the outer dimensions of vertical posts 114. Each opposed leg 128 includes an outwardly-flared portion 128a that facilitates releasable coupling of coupler 122 to vertical post 114 by guiding the vertical post through the open end 126, whereby opposed legs 128 initially flex apart to receive the vertical post, and then contract around the vertical post to retain the horizontal support 116 at the vertical post 114, with the post disposed or received inside the C-shaped channel defined between the opposed legs 128, such as shown in FIG. 10.

Figure 10:
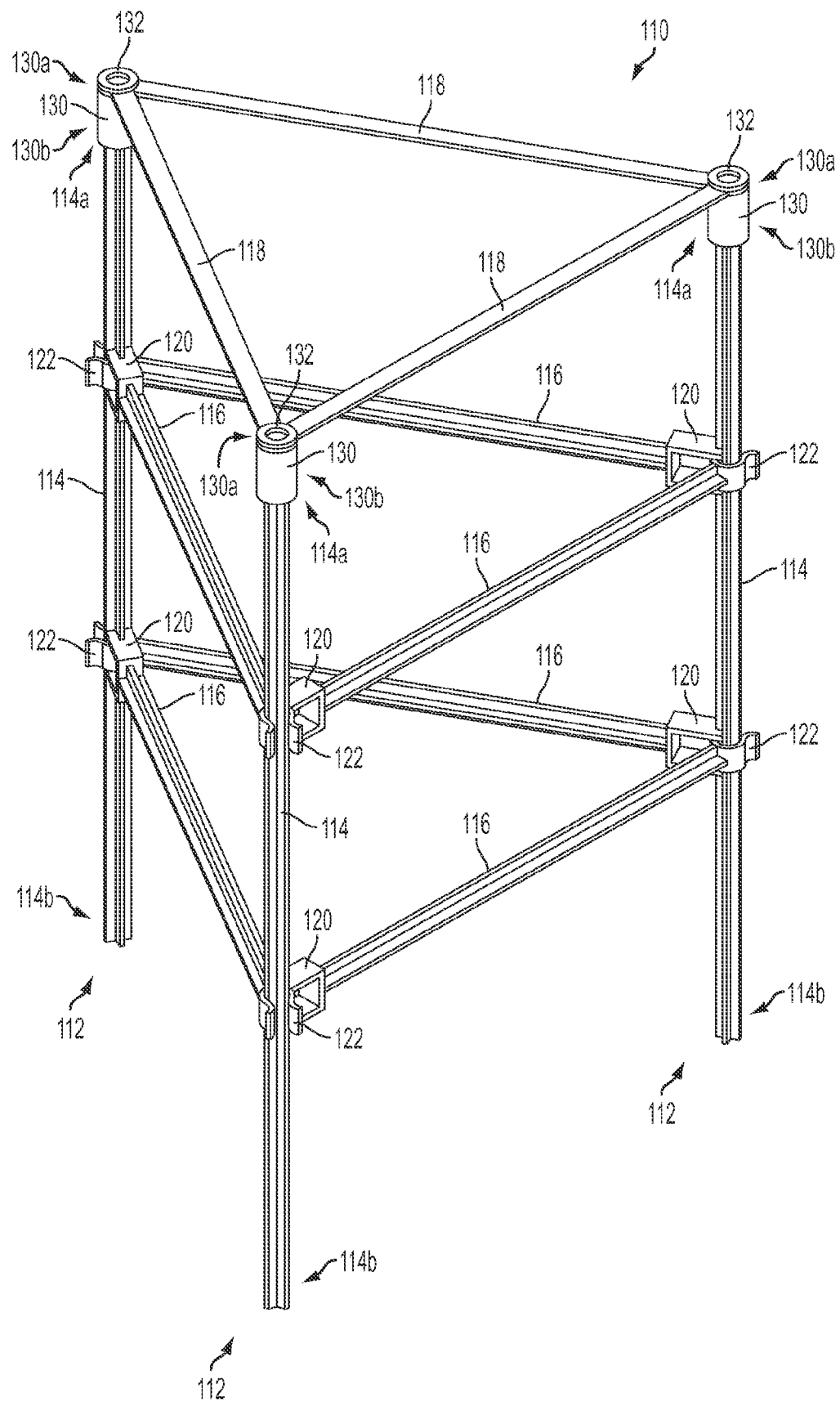
FIG. 10 is a perspective view of another plant support assembly in accordance with the present invention.
Figure 11:
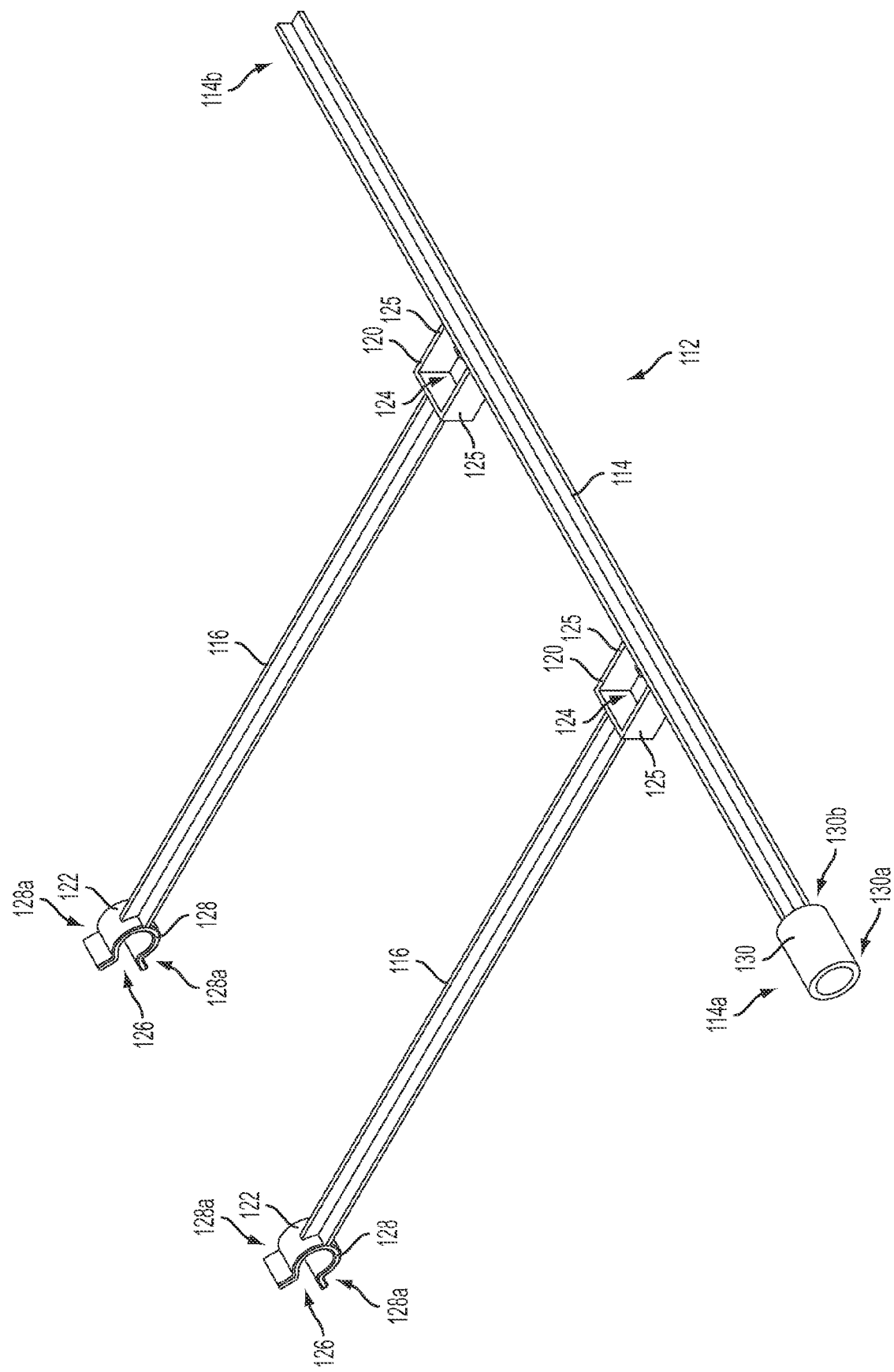
FIG. 11 is a perspective view of a support subassembly of the present invention.
Figure 12A:
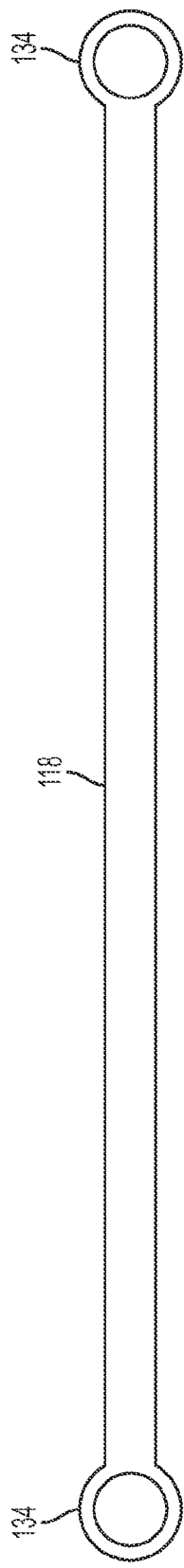
FIG. 12A is a top plan view of a connecting element of the plant support of FIG. 10.
Figure 12B:
FIG. 12B is a side elevation of the connecting element of FIG. 12A.
Figure 13B:
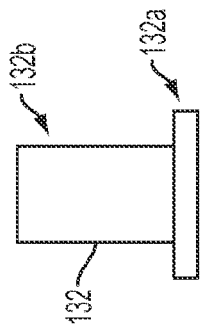
FIG. 13B is a side elevation of the connecting member of FIG. 13A.
Figure 13A:
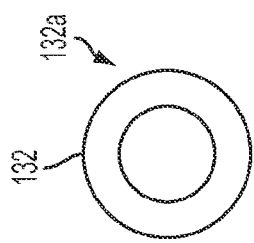
FIG. 13A is a top plan view of a connecting member for connecting or joining the ends of vertical posts of the plant support of FIG. 10.

When the horizontal support is attached or connected to the post, one of the legs 128 of the coupler 122 may be received in the C-shaped aperture of the fixed coupler 120 (such as shown in FIG. 10) so that the horizontal supports 116 may be disposed at the same level and need not be staggered in height along the vertical posts. Releasable coupler 122 is limited or substantially prevented from sliding along vertical posts 114 by one of opposed legs 128 contacting a lower one of the legs 125 of fixed coupler 120 (with legs 125 acting as stop members), thereby preventing further downward or sliding movement of releasable coupler 122. Optionally, it will be appreciated that other means of preventing couplers from sliding along vertical posts are possible, such as those described above with the reference to FIGS. 6-9B.

Figure 14:
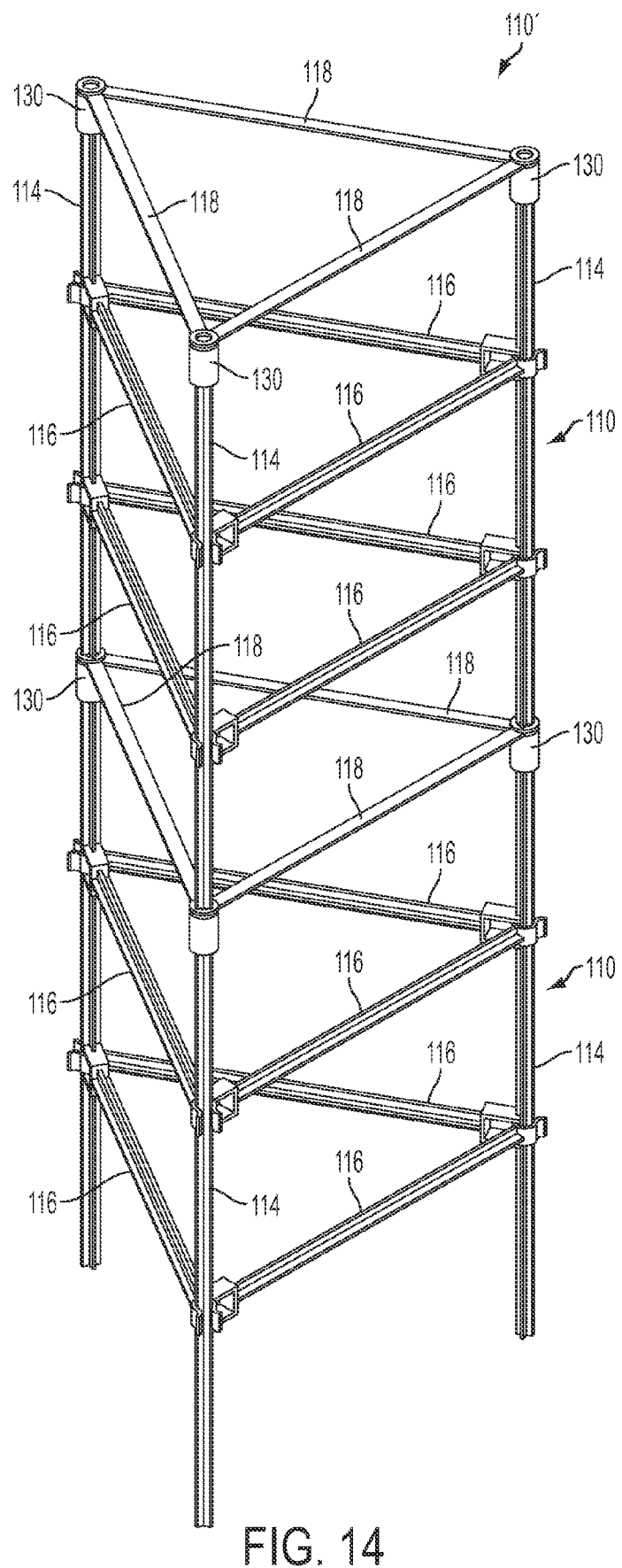
FIG. 14 is a perspective view of a pair of plant supports of FIG. 10 stacked atop one another to form a double-height plant support in accordance with the present invention.
Figure 15:
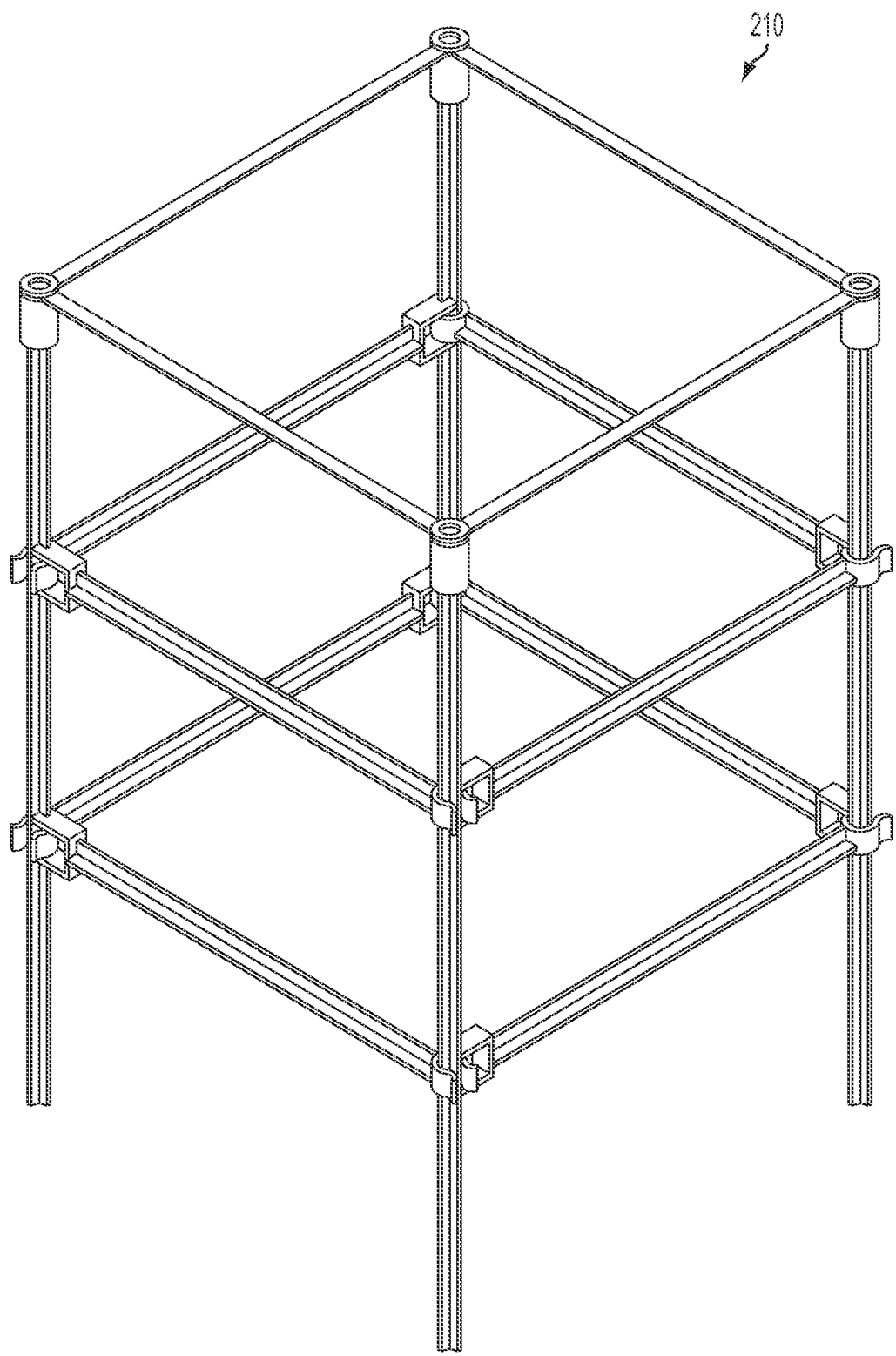
FIG. 15 is a perspective view of a plant support enclosure in a parallelogram configuration having four of the subassemblies of FIG. 11 joined together to establish a closed structure in accordance with the present invention.
Figure 16:
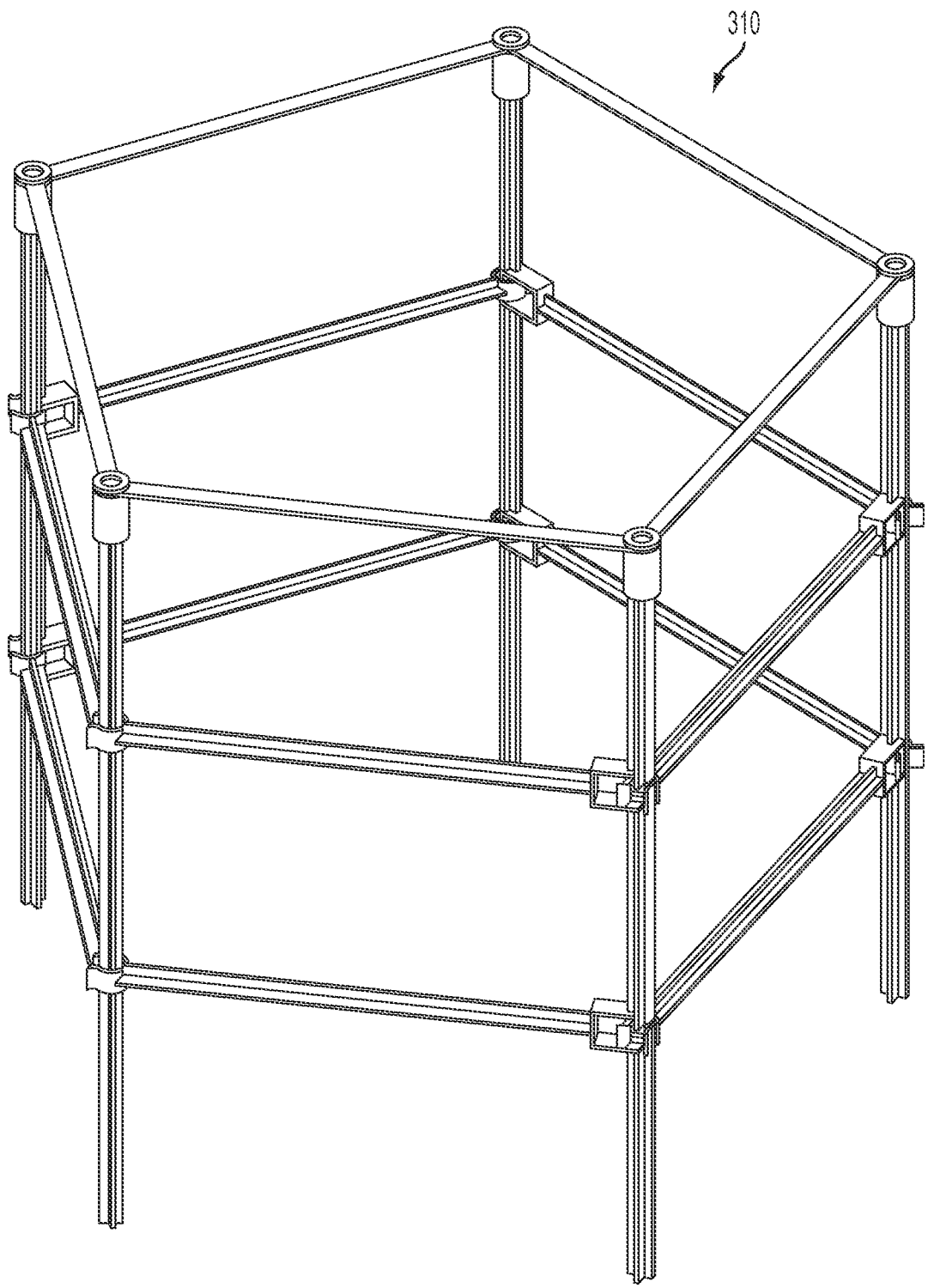
FIG. 16 is a five-sided plant support enclosure having five of the subassemblies of FIG. 11 joined together to establish a closed structure in accordance with the present invention.
Figure 17:
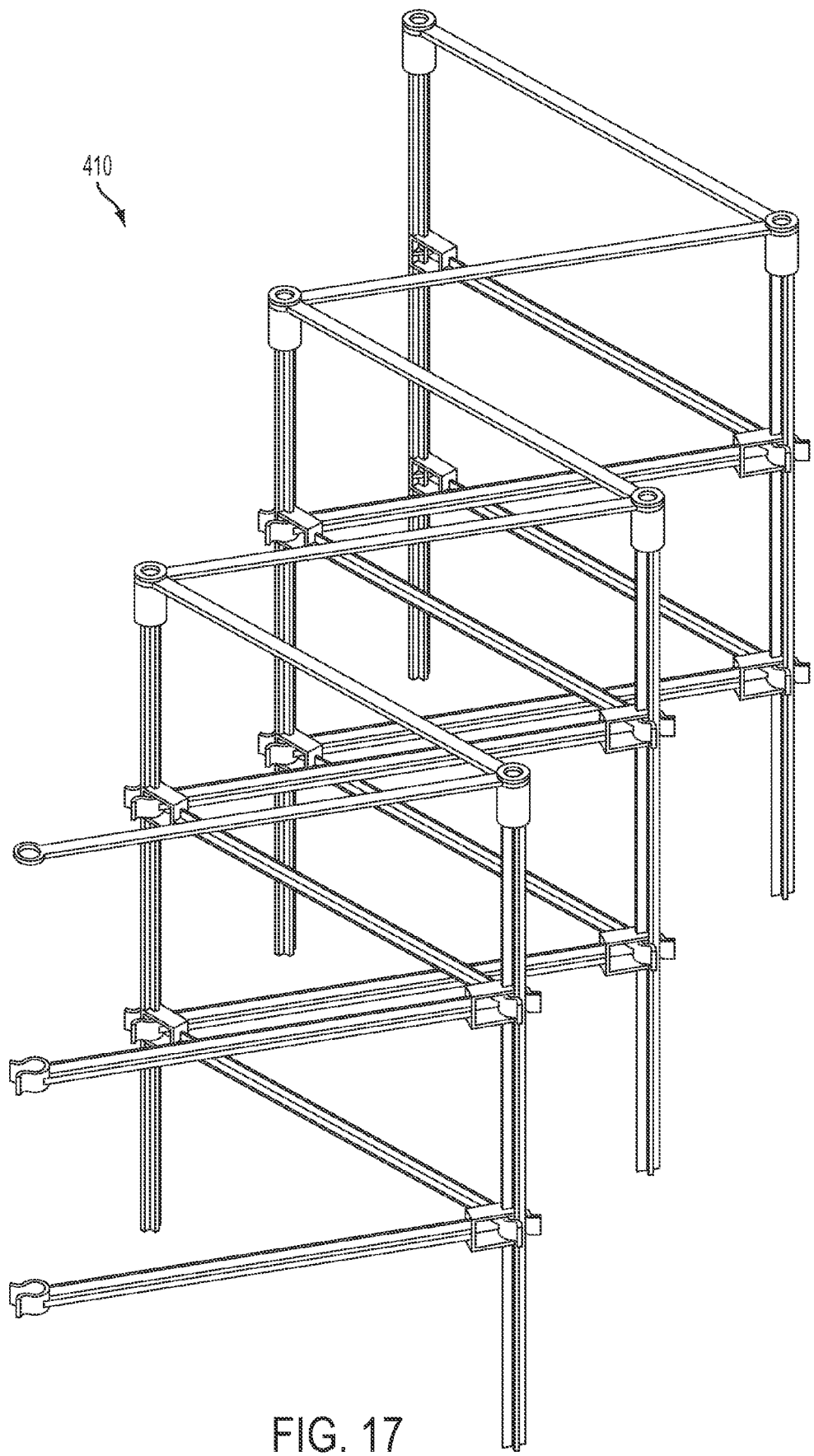
FIG. 17 is a perspective view of a portion of an open-configuration plant support having a zigzag or bent pattern of supports in accordance with the present invention.
Figure 18:
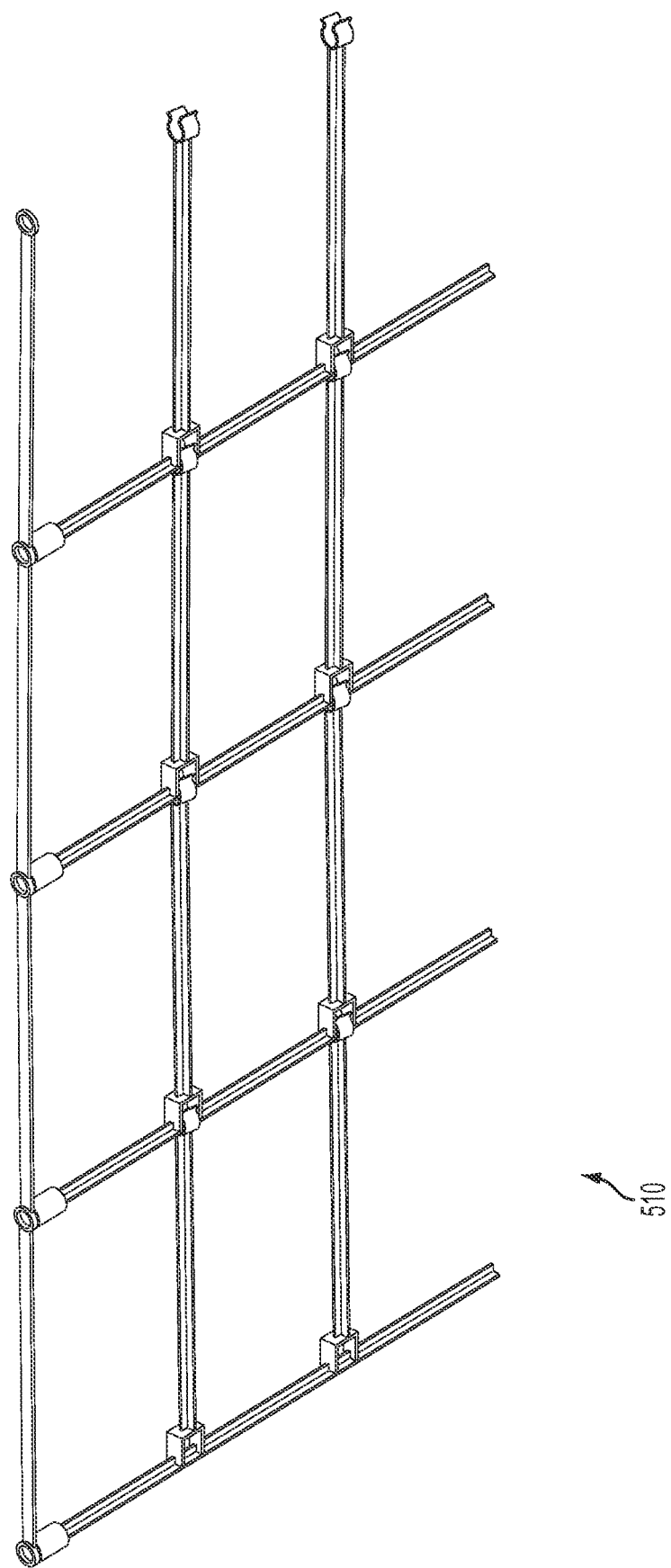
FIG. 18 is a perspective view of another open-configuration plant support having a generally straight alignment of supports in accordance with the present invention.

In the illustrated embodiment, a hollow-cylindrical coupler or barrel or sleeve 130 receives upper end portion 114a of vertical posts 114, and is configured to facilitate attachment of connecting elements 118 in addition to optional stacking of multiple plant support assemblies 110, such as described below. For example, sleeve 130 may receive upper end portion 114a of vertical post 114 via an interference fit to frictionally retain the coupler on the vertical post. Optionally, sleeve 130 may be glued or otherwise fastened to vertical post 114. Sleeve 130 includes an upper end portion 130a and a lower end portion 130b, the lower end portion 130b for receiving upper end portion 114a of vertical post 114, and the upper end portion 130a for receiving lower end portion 114b of another vertical post (such as shown in FIG. 14) and/or for receiving a connecting member or insert 132 that facilitates attachment of connecting elements 118.

Connecting elements 118 include hollow ring portions 134 at opposite ends thereof for attachment of the elements at or near upper end portions 114a of vertical posts 114. Connecting members 132 include upper flanges 132a and lower portions 132b. The lower portions 132b are inserted into and engage the upper end portion 130a of sleeve 130 to retain the connecting element 118 and insert 132 at the sleeve 130. Connecting members 132 and hollow ring portions 134 are cooperatively sized so that lower portions 132b of connecting members 132 are insertable into hollow ring portions 134 of connecting elements 118, while upper flanges 132a of connecting members 132 are sized so as not to pass through hollow ring portions 134, and retain the hollow ring portions against upper end portions 130a of sleeves 130.

Accordingly, and as shown in FIGS. 10 and 14-18, connecting elements 118 are attachable at upper end portions 114a of vertical posts 114 by placing hollow ring portions 134 (FIGS. 12A and 12B) of connecting elements 118 atop upper end portions 130a of sleeves 130 (stacking hollow ring portions 134 of adjacent connecting elements 118 atop one another as necessary), and retaining the hollow ring portions at sleeves 130 by inserting lower portions 132b of connecting members 132 through hollow ring portions 134 and into upper end portions 130a of sleeves 130. To facilitate retention of connecting elements 118, lower portion 132b of connecting member 132 may be sized to fit tightly within upper end portion 130a of sleeves 130 so as to create a frictional or interference fit.

It will be appreciated by those skilled in the art that substantially any number of subassemblies may be coupled together to form the desired or appropriate support structure or assembly, such as, for example, a fully-closed enclosure (such as a triangular-shaped structure, a square-shaped structure, or other polygonal-shaped structure), an open-ended enclosure (such as a C-shaped enclosure), or a trellis or fence structure having opposite ends. For example, three subassemblies 112 may be joined to form a plant support assembly 110 having the shape of an equilateral triangle when viewed from above (FIG. 10). Optionally, two or more plant support assemblies 110 may be stacked in the manner described above with sleeves 130 of a lower support assembly 110 receiving the lower end portion of a vertical post of an upper support assembly in order to form a plant support assembly 110' having increased height (FIG. 14). It will further be appreciated that additional subassemblies 112 may be added to create different shapes of closed enclosures, such as, for example, a four-sided enclosure or structure 210 (FIG. 15), a five-sided enclosure or structure 310 (FIG. 16), or enclosures having virtually any other number of sides. Optionally, two or more subassemblies 112 may be combined or attached to one another to create an open form, such as a zigzag pattern or bent wall structure 410 (FIG. 17) or a straight pattern or wall 510 (FIG. 18) resembling a fence or trellis.

Thus, substantially any number of subassemblies 112 may be releasably snap-fit together by joining releasable couplers 122 to the vertical posts 114 of adjacent subassemblies 112 and attaching connecting rods 118 using connecting members 132 and sleeves 130. Plant support assemblies 110 may thus be readily assembled and disassembled and/or reconfigured by hand, without the use of tools, and may be readily disassembled and stored in a flat configuration during periods of nonuse in order to minimize storage space for the assembly components. The height of the support structure may also be readily adjusted or increased or decreased during the growing season by stacking or unstacking similarly-shaped assemblies atop one another to support growing plants.

Therefore, the present invention provides a plant support structure or assembly that is readily configurable to a desired or appropriate size and shape depending on the particular application of the support assembly. The horizontal supports or cross members may be readily attached at desired or appropriate locations along the vertical posts and may be retained at the selected height along the posts, in order to provide the desired or appropriate structural rigidity of the support assembly and the desired configuration to promote climbing of the plant that the support assembly is supporting. The vertical posts and the horizontal supports may both comprise a plastic or polymeric material and may be molded to the desired shapes of the vertical posts and horizontal supports.

Changes and modifications to the specifically described embodiments may be carried out without departing from the principles of the present invention, which is intended to be limited only by the scope of the appended claims as interpreted according to the principles of patent law including the doctrine of equivalents.

The embodiments of the invention in which an exclusive property is claimed are defined as follows:

1. A plant support assembly comprising:
   a plurality of supports extending generally vertically from a support surface and having upper end portions and lower end portions, said generally vertical supports comprising a plurality of stop members spaced therealong;
   couplers at said upper end portions of said generally vertical supports, wherein said couplers are configured to join said upper end portion of one of said generally vertical supports to said lower end portion of another of said generally vertical supports;
   a plurality of cross supports, said cross supports having end portions for engaging said generally vertical supports between said stop members;
   wherein at least one of said end portions of each of said cross supports releasably engages one of said generally vertical supports between adjacent ones of said stop members, and wherein said stop members are configured to limit movement of said cross support along said generally vertical support; and
   wherein, when assembled with said couplers joining respective upper and lower end portions together and with at least one cross support engaged with respective generally vertical supports said plant support assembly comprises at least two generally parallel and generally vertical support structures each comprising at least two individual supports coupled together by at least one respective coupler.

2. The plant support assembly of claim 1, wherein said lower end portions of said generally vertical supports are configured to penetrate a support surface comprising a soil material for supporting said assembly at the soil material.

3. The plant support assembly of claim 1, wherein said couplers comprise hollow cylindrical members.

4. The plant support assembly of claim 1, wherein said at least one of said end portions of said cross supports comprises an open-ended collar for receiving said generally vertical supports.

5. The plant support assembly of claim 4, wherein said open-ended collars comprise flexible opposed portions for receiving said generally vertical supports therebetween.

6. The plant support assembly of claim 5, wherein said open-ended collars of said cross supports comprises:
a pair of opposed legs defining a generally C-shaped opening, each of said legs having an outwardly-flared portion for guiding said generally vertical support through said opening; and
wherein said legs flex apart to receive said generally vertical support when said cross support is urged toward said generally vertical support, and then contract toward their initial state when said generally vertical support is received in said C-shaped opening to releasably retain said generally vertical support inside said C-shaped opening.

7. The plant support assembly of claim 6, wherein said cross support comprises a tab extending into said C-shaped opening and configured to engage one of said stop members of said generally vertical supports to limit movement of said cross supports along said generally vertical support, and wherein said tab engages and rests on one of said stop members when said cross support is engaged with said generally vertical support.

8. The plant support assembly of claim 7, wherein said stop members comprise disc portions having diameters that are approximately equal to a diameter of the cross dimensions of said generally vertical support between said disc portions.

9. The plant support assembly of claim 6, wherein said stop members comprise disc portions.

10. The plant support assembly of claim 9, wherein the diameters of said disc portions are greater than a diameter of the cross dimensions of said generally vertical support between said disc portions, and wherein said open-ended collar of said cross support engages and rests on said disc portion when said cross support is engaged with said generally vertical support.

11. A plant support assembly comprising:
a plurality of supports extending generally vertically from a support surface and having upper end portions and lower end portions, said generally vertical supports comprising a plurality of stop members spaced thereal-ong;
couplers at said upper end portions of said generally vertical supports, wherein said couplers are configured to join said upper end portion of one of said generally vertical supports to said lower end portion of another of said generally vertical supports;
a plurality of cross supports, said cross supports having end portions for engaging said generally vertical supports between said stop members;
wherein at least one of said end portions of each of said cross supports releasably engages one of said generally vertical supports between adjacent ones of said stop members, and wherein said stop members are configured to limit movement of said cross support along said generally vertical support; and
wherein said generally vertical supports comprise cross-shaped sections disposed between said stop members.

12. The plant support assembly of claim 1, wherein both of said opposite end portions of said cross support releasably engage respective generally vertical supports.

13. The plant support assembly of claim 1, wherein the other of said end portions of said cross support is fixedly attached to a respective generally vertical support, and wherein said stop member comprises a portion of said other end portion.

14. The plant support assembly of claim 1, comprising a plurality of connecting elements having opposite end portions, wherein said opposite end portions are configured to engage said upper end portions of said generally vertical supports so that said connecting elements span between said upper end portions of adjacent ones of said generally vertical supports.

15. The plant support assembly of claim 14, wherein each end portion of said connecting element comprises a hollow ring, and wherein said hollow rings are positionable at said couplers and retained at said couplers via respective retaining elements that are received at least partially through said hollow rings and at least partially into said couplers.

16. A plant support assembly comprising:
a plurality of supports extending generally vertically from a support surface and having upper end portions and lower end portions, said lower end portions adapted to penetrate a soil material of the support surface, said generally vertical supports comprising a plurality of disc portions disposed along said generally vertical supports with sections of cross elements between said disc portions, said cross elements forming cross-shaped sections of said generally vertical supports;
a plurality of lateral supports, said lateral supports having opposite end portions for engaging said generally vertical supports, at least one of said opposite end portions comprising a coupling element having a pair of flexible opposed legs defining a generally C-shaped opening;
wherein said legs of said end portions of said lateral supports flex apart to receive a portion of said generally vertical support when said lateral supports are urged toward said generally vertical support, and then contract toward their initial state when said generally vertical support is received in said C-shaped opening to releasably retain said generally vertical support inside said C-shaped opening; and
wherein said disc portions engage said coupling element of said lateral support to limit vertical movement of said lateral support along said generally vertical support.

17. The plant support assembly of claim 16, further comprising couplers adapted to join said upper end portion of a first of said generally vertical supports to said lower end portion of a second of said generally vertical supports, wherein said lower end portion of said second generally vertical support is positioned directly above said upper end portion of said first generally vertical support.

18. The plant support assembly of claim 16, wherein said couplers comprise hollow cylindrical members having recesses in their upper surfaces, said recesses adapted to receive said lower end portions of others of said generally vertical supports.

19. The plant support assembly of claim 16, wherein both of said opposite end portions of said lateral supports releasably engage respective generally vertical supports.

20. The plant support assembly of claim 16, wherein another of said opposite end portions is fixedly attached to said generally vertical supports.

21. The plant support assembly of claim 16, wherein the diameters of said plurality of disc portions are substantially equal to the outer dimensions of said cross-shaped sections, and wherein said at least one opposite end portion comprises a tab for engaging said disc portions to limit movement of said lateral supports along said generally vertical supports via engagement of said tab with said disc portion.

22. The plant support assembly of claim 16, wherein the diameters of said plurality of disc portions are greater than the outer dimensions of said cross-shaped sections, and wherein said at least one end portion engages said disc portion so as to limit movement of said lateral supports along said generally vertical supports.

23. The plant support assembly of claim 16, wherein said plant support assembly is configurable to form at least one of (a) an enclosure comprising three or more sides and (b) a trellis.

* * * * *